US008150946B2

(12) United States Patent
Wu et al.

(10) Patent No.: US 8,150,946 B2
(45) Date of Patent: Apr. 3, 2012

(54) PROXIMITY-BASED MEMORY ALLOCATION IN A DISTRIBUTED MEMORY SYSTEM

(75) Inventors: Yuguang Wu, Mountain View, CA (US); Christopher A. Vick, San Jose, CA (US); Michael H. Paleczny, San Jose, CA (US); Bo Yang, Mountain View, CA (US); Olaf Manczak, Hayward, CA (US); Jay R. Freeman, Palo Alto, CA (US); Phyllis E. Gustafson, Pleasanton, CA (US); Miguel-Angel Lujan Moreno, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1153 days.

(21) Appl. No.: 11/409,205

(22) Filed: Apr. 21, 2006

(65) Prior Publication Data

US 2007/0250604 A1    Oct. 25, 2007

(51) Int. Cl.
    *G06F 15/177*    (2006.01)
(52) U.S. Cl. ........ 709/220; 709/214; 709/223; 709/224; 370/254; 370/256
(58) Field of Classification Search .................. 709/220, 709/214, 223, 224; 370/254, 256
    See application file for complete search history.

(56) References Cited

U.S. PATENT DOCUMENTS

| | | | | |
|---|---|---|---|---|
| 5,511,208 A | * | 4/1996 | Boyles et al. ................. | 709/223 |
| 5,881,050 A | * | 3/1999 | Chevalier et al. ............. | 370/230 |
| 6,070,187 A | * | 5/2000 | Subramaniam et al. ...... | 709/220 |
| 6,105,053 A | * | 8/2000 | Kimmel et al. ................ | 718/105 |
| 6,304,913 B1 | * | 10/2001 | Rune .............................. | 709/241 |
| 6,614,764 B1 | * | 9/2003 | Rodeheffer et al. .......... | 370/254 |
| 7,124,410 B2 | | 10/2006 | Berg et al. | |
| 7,286,490 B2 | * | 10/2007 | Saleh et al. .................... | 370/254 |
| 7,313,795 B2 | | 12/2007 | Chew et al. | |
| 7,899,027 B2 | * | 3/2011 | Castagnoli et al. ........... | 370/350 |
| 2002/0150094 A1 | * | 10/2002 | Cheng et al. ................... | 370/389 |
| 2003/0084076 A1 | * | 5/2003 | Sekiguchi et al. ............. | 707/205 |
| 2006/0215583 A1 | * | 9/2006 | Castagnoli ..................... | 370/254 |
| 2007/0053309 A1 | * | 3/2007 | Poojary et al. ................. | 370/256 |
| 2007/0214333 A1 | | 9/2007 | Nijhawan et al. | |
| 2007/0233967 A1 | | 10/2007 | Rangarajan et al. | |
| 2007/0250604 A1 | * | 10/2007 | Wu et al. ........................ | 709/220 |
| 2008/0059556 A1 | * | 3/2008 | Greenspan et al. ........... | 709/201 |
| 2008/0071890 A1 | * | 3/2008 | Meier et al. .................... | 709/220 |

* cited by examiner

*Primary Examiner* — Thu Ha Nguyen
(74) *Attorney, Agent, or Firm* — Robert C. Kowert; Meyertons, Hood, Kivlin, Kowert & Goetzel, P.C.

(57) ABSTRACT

A system and method for allocating the nearest available physical memory in a distributed, shared memory system. In various embodiments, a processor node may broadcast a memory request to a first subset of nodes connected to it via a communication network. In some embodiments, if none of these nodes is able to satisfy the request, the processor node may broadcast the request to additional subsets of nodes. In some embodiments, each node of the first subset of nodes may be removed from the processor node by one network hop and each node of the additional subsets of nodes may be removed from the processor node by no more than an iteratively increasing number of network hops. In some embodiments, the processor node may send an acknowledgment to one node that can fulfill the request and a negative acknowledgement to other nodes that can fulfill the request.

20 Claims, 9 Drawing Sheets

PROXIMITY-BASED MEMORY ALLOCATION IN A DISTRIBUTED MEMORY SYSTEM

BACKGROUND OF THE INVENTION

1. Field of the Invention

This invention relates to computing systems and more particularly to memory allocation within a distributed shared memory system.

2. Description of the Relevant Art

Computer systems that include one or more banks of memory may use different architectures to organize and access that memory. Some computer systems may include a single, dedicated bank of memory for each of one or more processors and accessible only by that processor. In these distributed configurations, memory access times may be highly predictable, as the dedicated memory bank may respond according to uniform memory access times. In such configurations, no other processors (or their processes) may be able to access the dedicated bank of memory, so the local processor may have complete control over the memory accesses for its processes. Such configurations may not provide flexibility in terms of the amount of memory available for any one process, if the processor can only access its own local memory.

Other computer systems are configured to include a single memory space that is shared between two or more processors. While this configuration may allow flexibility for each processor to address different amounts of memory for different processes, it may not efficiently scale to large systems. For example, in a computer system including two processors, if both processors need to access the shared memory at the same time, one processor may sit idle while waiting for a turn to access data, negatively impacting system performance. The problem may be compounded when more processors are included in the system.

Some computer systems are configured to include features of both a shared memory architecture and a dedicated memory architecture, in what is called a Distributed Shared Memory (DSM) system. In DSM systems, a separate (local) memory may be provided for each processor, but each of the processors may also be able to access non-local memory, such as a shared block of main memory. Some DSM systems are page-based systems, in which a linear memory space is distributed between processors based on one or more fixed memory partitions, such as a page size. Other DSM systems are object-based systems, in which processes on multiple machines share an abstract memory space filled with shared objects.

Some DSM systems employ a non-uniform memory access or non-uniform memory architecture (NUMA). Under NUMA, the memory access time for any given access depends on the location of the accessed memory relative to the processor. In such systems, the processor can typically access its own local memory, such as its own cache memory, faster than non-local memory. In these systems, non-local memory may include one or more banks of memory shared between processors and/or memory that is local to another processor.

In a NUMA shared memory multiprocessor computer system, each processor, on behalf of some process, may from time to time need to allocate some memory. If sufficient local memory is available, the processor may allocate local memory to the process. If not, the processor may need to allocate non-local memory. In general, if the processor is able to allocate nearby memory, according to the system configuration, the latency of accesses to that memory may be reduced and the performance of the system may be increased. In conventional systems a centralized scheme, in which a single processor is responsible for memory allocations for all processors, may be used to allocate nearby non-local memory to a processor, but such a scheme may lack the ability to efficiently scale to large systems.

SUMMARY

A computer system may include multiple processor nodes, memory nodes and other nodes connected via a network according to any of various network topologies. Some such computer systems may employ a non-uniform memory access or non-uniform memory architecture (NUMA) configuration, as described above. In a NUMA shared memory multiprocessor computer system, each processor, may, in some embodiments, allocate to its processes the nearest available physical memory capable of satisfying the memory requirements of those processes, using a proximity-based memory allocation scheme.

In one embodiment, a system may include a processor node and a plurality of memory nodes, where the processor node includes a processor and a network interface and the memory nodes each include a memory and a network interface. In one embodiment, a communication network may be configured to interconnect the processor node and the plurality of memory nodes via the network interfaces according to a network topology. In one embodiment, each of the memory nodes may be removed from the processor node by a respective number of network hops according to the network topology. In one embodiment, the processor may be configured to broadcast a memory request to a first subset of the plurality of memory nodes, where each memory node of the first subset is removed from the processor node by no more than a given number of network hops. If no memory node of the first subset indicates that it can satisfy the memory request, the processor may be configured to increase the number of network hops and broadcast the memory request to a second subset of the plurality of memory nodes, where each memory node of the second subset is removed from the processor node by no more than the increased number of network hops.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In various embodiments of a distributed shared memory (DSM) system comprising one or more processors, a separate (local) memory may be provided for each processor, but each processor may also be able to access non-local memory, such as a shared block of main memory. Some DSM systems employ non-uniform memory access or non-uniform memory architecture (NUMA). Under NUMA, the memory access time for any given access depends on the location of the accessed memory relative to the processor accessing it. In such systems, a processor may be able to access its own local memory, such as its own cache memory or a memory co-located with the processor on the same integrated circuit device or printed circuit board, faster than it can access non-local memory. In these systems, non-local memory may include one or more banks of memory shared between processors and/or memory that is local to another processor. One example of a system that might employ a NUMA architecture is an application server.

In some embodiments of NUMA shared memory multiprocessor systems, each processor may allocate to its processes a physical memory capable of satisfying the memory requirements of those processes, based on the current memory utilization, using a proximity-based memory allocation technique. In some embodiments, a proximity-based memory allocation technique, as described herein, may be used to find the nearest available physical memory. The first memory to respond favorably to a memory request broadcast according to the allocation scheme may, in some embodiments, be designated as the nearest available memory. In other embodiments, the memory that is nearest to the processor and that responds favorably to the request may be designated as the nearest available memory.

Figure 1:
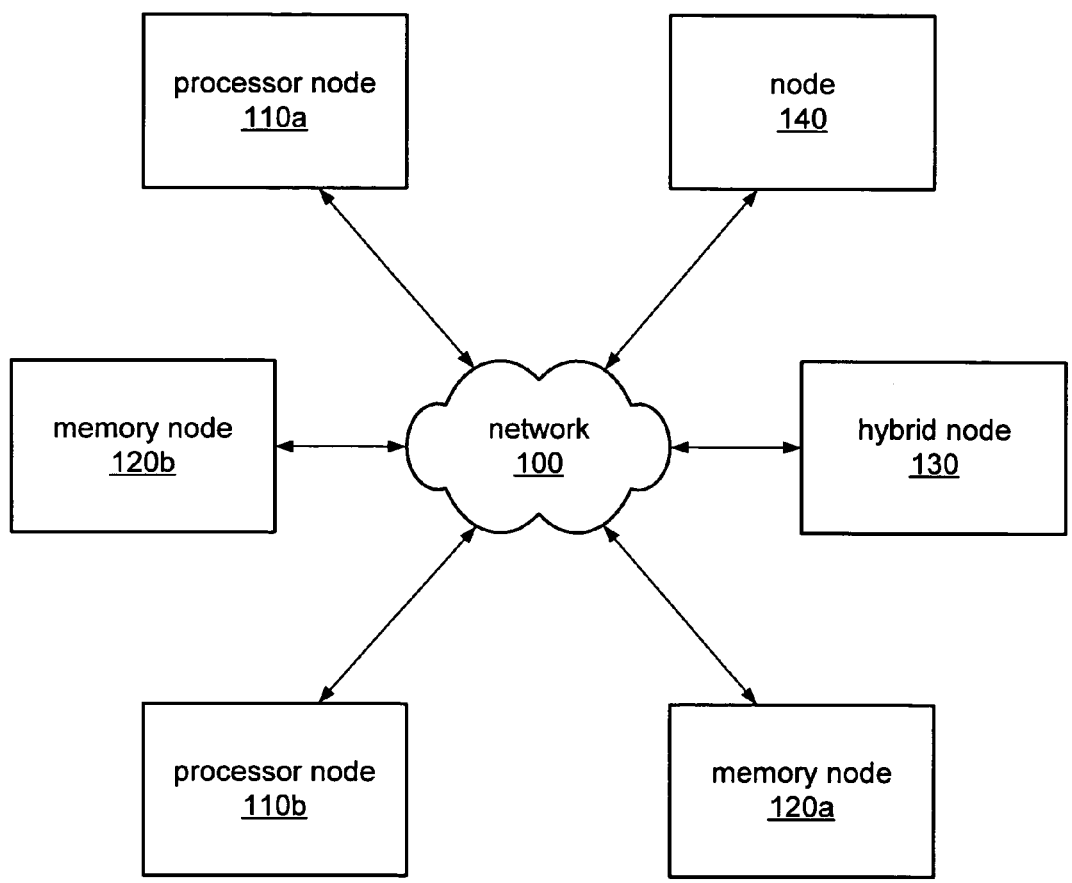
FIG. 1 illustrates an exemplary computer system suitable for implementation of memory allocation via a proximity-based allocation technique.

In various embodiments, a plurality of nodes making up a computer system may be connected via a communication network. For example, FIG. 1 illustrates a communication network 100 connecting various types of nodes. In this example, two processor nodes (110a and 110b), two memory nodes (120a and 120b), one hybrid node (130), and one other node (140) are all connected to each other via network 100. These nodes may be connected to each other according to any of various network topologies, including, but not limited to, a linear topology, a hierarchical (tree) topology, a star topology, a mesh topology, a grid topology, a ring topology, a toroidal (torus) topology, a cube topology, a hypercube topology, or any other network topology, according to various embodiments. Each of the memory nodes of the computer system may be removed from a processor node of the computer system by a respective number of network hops according to the network topology. In some embodiments, there may be more or fewer processor nodes 110, memory nodes 120, hybrid nodes 130 or other nodes 140 connected via network 100 than in the embodiment illustrated by FIG. 1.

In some embodiments, a computer system including network 100 and various processor nodes 110, memory nodes 120, hybrid nodes 130 and other nodes 140, may employ a NUMA architecture. In such embodiments, a processor node 110 may be configured to allocate some amount of memory for one of its processes. The memory access time may depend on how far removed the memory allocated to the process is from the processor according to the topology of network 100. For example, if the memory that is allocated to the process is one network hop away from the requesting processor, the access time may be shorter than if the memory that is allocated to the process is two network hops away from the requesting processor. In some embodiments, the shortest memory access time may be realized when the processor is able to allocate its own local memory to the process and does not have to request memory from another node.

Figure 2A:
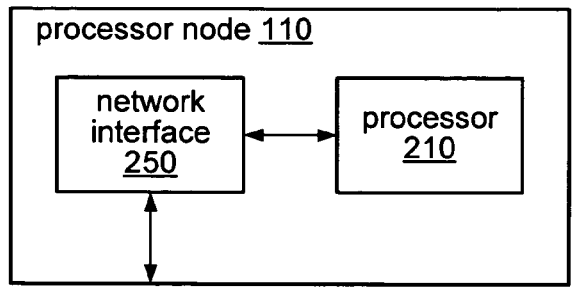
FIGS. 2A-2C illustrate various nodes of a computer system suitable for implementation of a proximity-based memory allocation technique, according to one embodiment.
Figure 2B:
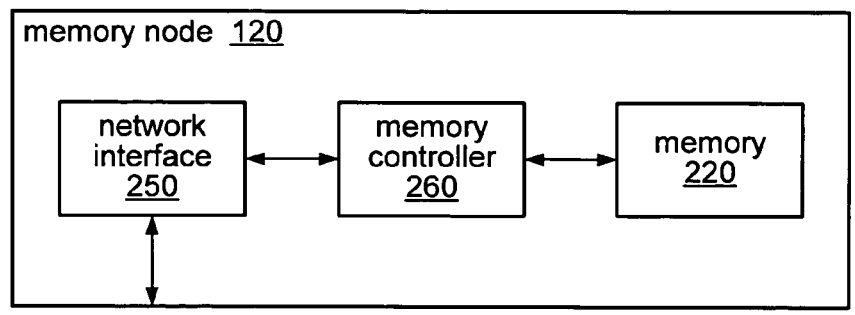
Figure 2C:
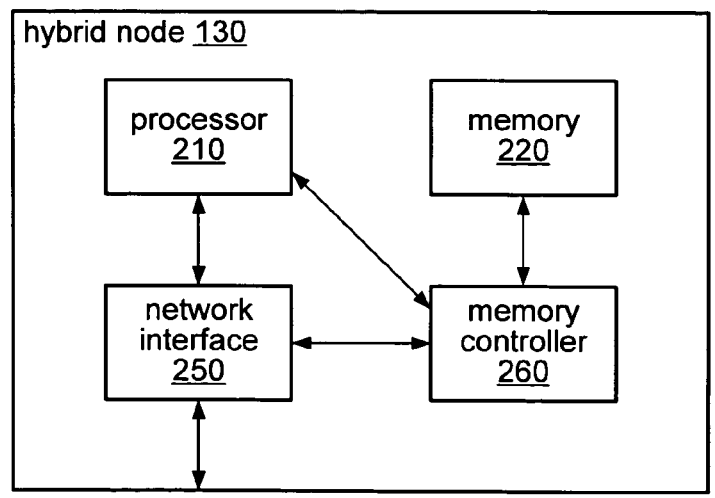

The nodes connected to network 100 may be any of various functional types, including, but not limited to, processor nodes 110, memory nodes 120, hybrid nodes 130, and nodes with other functionality, such as nodes 140. In some embodiments, individual nodes may include combinations of functionality found in two or more other node types. Three examples of nodes that may be connected to network 100 in a NUMA architecture are illustrated by FIGS. 2A-2C. FIG. 2A illustrates a processor node 110, according to one embodiment. In this example, processor node 110 includes a processor (CPU) 210 and a network interface 250, configured to couple processor node 110 to network 100. In different embodiments, these functional elements may be implemented in hardware (such as in one or more integrated circuits or printed circuit boards), in software (executing on processor 210 or another suitable device), or in a combination of hardware and software.

Processor 210 may, in various embodiments, be configured to implement any suitable instruction set architecture (ISA), such as x86, SPARC, PowerPC, etc. Processor 210 may comprise a single CPU core, multiple CPU cores, or any combination of one or more general CPU cores and special-purpose cores (e.g., digital signal processors, hardware accelerators, co-processors, etc.) In various embodiments, processor 210 may comprise a superscalar architecture or may be configured to implement multi-threading.

Network interface 250 may, in various embodiments, be configured to implement different communication protocols or standards, such as Ethernet, HyperTransport (HT), Infiniband, or any other suitable interface technology. Network interface 250 may implement wired or wireless technologies via electrical, optical, or radio-based media, in different embodiments.

Network interface 250 may, in some embodiments, be configured to function as a relaying carrier for packets traveling on network 100. In such embodiments, network interface 250 may be configured to implement the concept of time-to-live (TTL) prevalent in data networking. For example, each packet traveling on network 100 may include in its header a TTL field, which is decremented at each intermediate relaying carrier on the packet's way toward its final destination. In some embodiments, when the TTL value is decremented to zero, the packet will be dropped; that is, it will not be forwarded from that carrier to any other nodes. In other embodiments, the value of a TTL field may be incremented as it travels on network 100 and may be dropped when it reaches a predetermined maximum value.

A processor node 110 may also include other hardware or software components, depending on the functionality of the node, in some embodiments. In some embodiments, the functional elements of processor node 110 may be partitioned into more or fewer hardware or software components or all of the functionality may be included in a single component, such as a single integrated circuit chip or printed circuit board. In some embodiments, processor node 110 may include local memory, such as cache memory. Cache memory may be implemented as a separate component of processor node 110 or may be integrated into processor 210, in different embodiments.

An exemplary memory node 120 is illustrated by FIG. 2B. In this example, memory node 120 includes memory 220, a memory controller 260 configured to control access to memory 220, and a network interface 250 configured to connect memory node 120 to network 100. These functional elements may be implemented in hardware (such as in one or more integrated circuits or printed circuit boards), in software (executing on memory controller 260 or another processor or other suitable device included in memory node 120 or elsewhere on network 100), or in a combination of hardware and software, according to various embodiments. Network interface 250 may, in some embodiments, be configured to function as a relaying carrier, as described above, for packets traveling on network 100. A memory node 120 may also include other hardware or software components, depending on the functionality of the node, in some embodiments.

Memory 220 is representative of various types of possible computer system memory, including, but not limited to, static or dynamic RAM, such as DDR/DDR2, SDRAM, ECC SDRAM, EDO RAM, Rambus RAM, etc., or a non-volatile memory such as ROM, EEPROM, Flash, etc. Memory 220 may include other types of memory as well, or any combination of memory types.

In some embodiments, the functional elements of memory node 120 may be partitioned into more or fewer hardware or software components or all of the functionality may be included in a single component, such as a single integrated circuit chip or printed circuit board. For example, in some embodiments, memory 220 and memory controller 260 of memory node 120 may be included in the same physical component, such as in a dual in-line memory module (DIMM). In some embodiments, each memory controller 260 may be configured to keep track of which processor has allocated given portions of its memory. In other embodiments, one or more processors in one or more other nodes of network 100 may do this bookkeeping. In such embodiments, memory 220 may be accessed directly through network interface 250, rather than through memory controller 260. According to various embodiments, hardware (in memory node 120 or another node on network 100), software (executing on one or more processor nodes on network 100), or a combination of hardware and software may be used to keep track of which portions of memory 220 are allocated to which processors and processes.

In some embodiments, a single node, such as hybrid node 130, may include the functionality of both a processor node and a memory node. FIG. 2C illustrates one such node. In this example, hybrid node 130 includes a processor 210, a memory 220, a memory controller 260 configured to control access to memory 220, and a network interface 250 configured to connect hybrid node 130 to network 100. In one embodiment, such as the one illustrated by FIG. 2C, processor 210 may be connected to memory 220 through memory controller 260. In other embodiments, processor 210 may be directly connected to memory 220 via an integrated memory controller, or memory 220 may be integrated within processor 210, such as if memory 220 is an integrated cache memory. In some embodiments, network interface 250 may be configured to function as a relaying carrier, as described above.

Hybrid node 130 may also include other hardware or software components, depending on the functionality of the node, in some embodiments. In some embodiments, the functional elements of hybrid node 130 may be partitioned into more or fewer hardware or software components or all of the functionality may be included in a single component, such as a single integrated circuit chip or printed circuit board. For example, in some embodiments, memory 220 and memory controller 260 of hybrid node 130 may be included in the same physical component, such as in a dual in-line memory module (DIMM). In some embodiments, each memory controller 260 may be configured to keep track of which processor has allocated given portions of its memory. In other embodiments, this bookkeeping may be done by a processor 210 of hybrid node 130 or by one or more processors 210 of one or more other nodes of network 100. According to various embodiments, hardware (in hybrid node 130 or another node on network 100), software (executing on processor 210 of hybrid node 130 or on one or more other processors 210 of one or more other nodes on network 100), or a combination of hardware and software may be used to keep track of which portions of memory are allocated to which processors and processes. In some embodiments, memory 220 may be accessed directly by processor 210 or may be accessed by a processor on another node through network interface 250, rather than through memory controller 260.

In some embodiments, various other nodes 140 may be configured to implement mass storage devices (e.g., disk drives), peripherals, input/output devices (e.g., displays or terminal devices), or any other desired function. One or more processor nodes 110, memory nodes 120, or hybrid nodes 130, in other embodiments, may also implement these or any other additional functions.

As used herein, the term "memory carrier" may refer to any node that includes memory and/or a memory controller, such as memory nodes 120, hybrid nodes 130, or any other nodes 140 that include memory and/or a memory controller.

Figure 3:
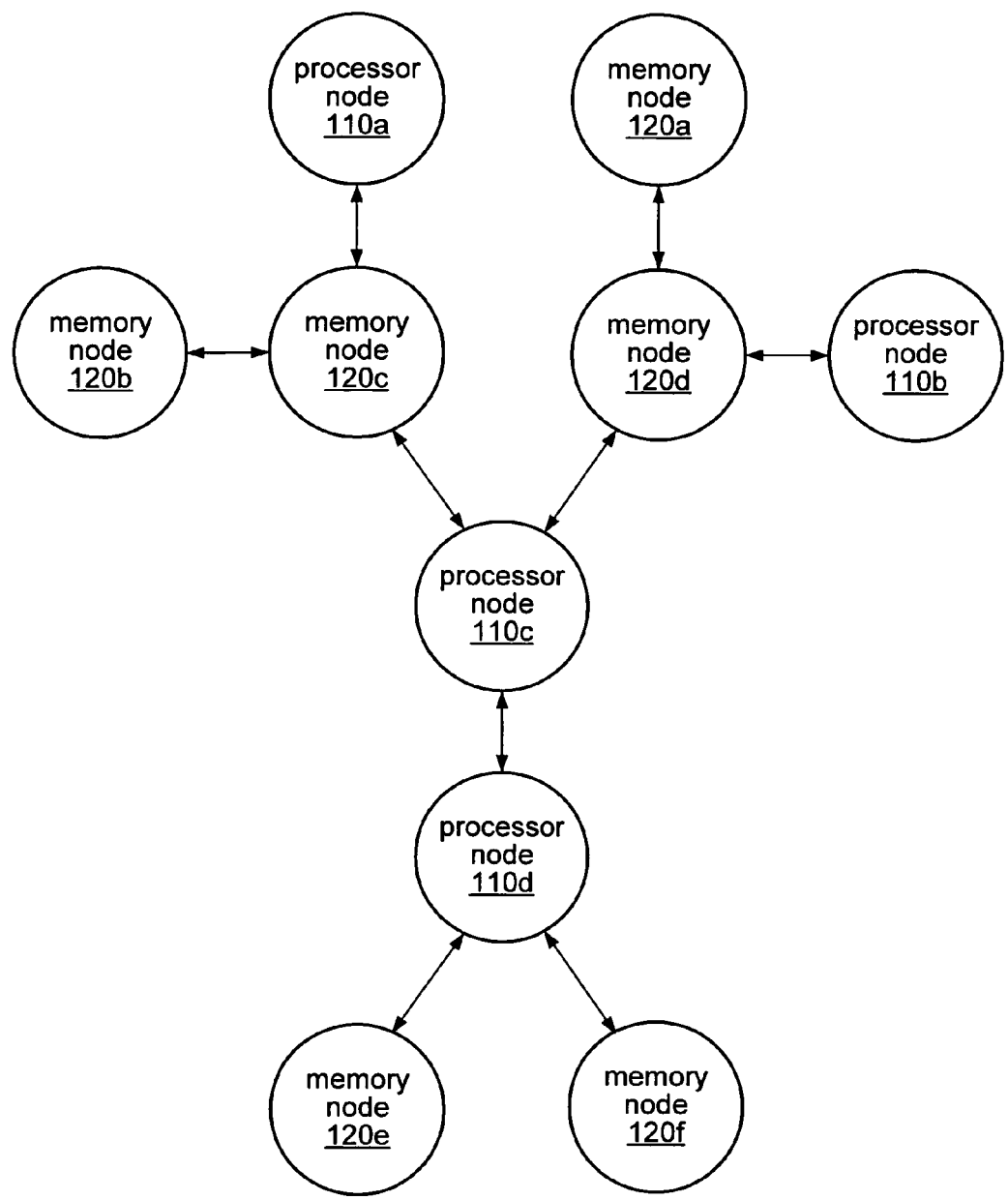
FIG. 3 illustrates one embodiment of a communication network suitable for implementation of a proximity-based memory allocation technique.

In a NUMA system, each processor node may be able to access memory locations on any node comprising shared memory. Proximity-based memory allocation may be employed in a NUMA system including any arbitrary network topology, through which the nodes are connected. Communication network 100 may be configured to interconnect various processor nodes 110, memory nodes 120, hybrid nodes 130 and other nodes 140. FIG. 3 illustrates one embodiment of a hierarchical tree topology connecting a plurality of processor nodes 110 and a plurality of memory nodes 120. Embodiments of a hierarchical tree topology may generally be distinguished from embodiments of a star topology in that a star topology typically includes a single, central "hub" node to which all other nodes are connected, while a tree topology may have two or more such "hub" nodes configured in a hierarchy. In some instances, star topologies may be subsets of tree topologies. According to various embodiments, network 100 may be configured as a tree or star topology connecting a single processor node 110 and multiple memory nodes 120, multiple processor nodes 110 and multiple memory nodes 120, one or more hybrid nodes 130, or any other combination of processor nodes 110, memory nodes 120, hybrid nodes 130 and/or other nodes 140.

Figure 4:
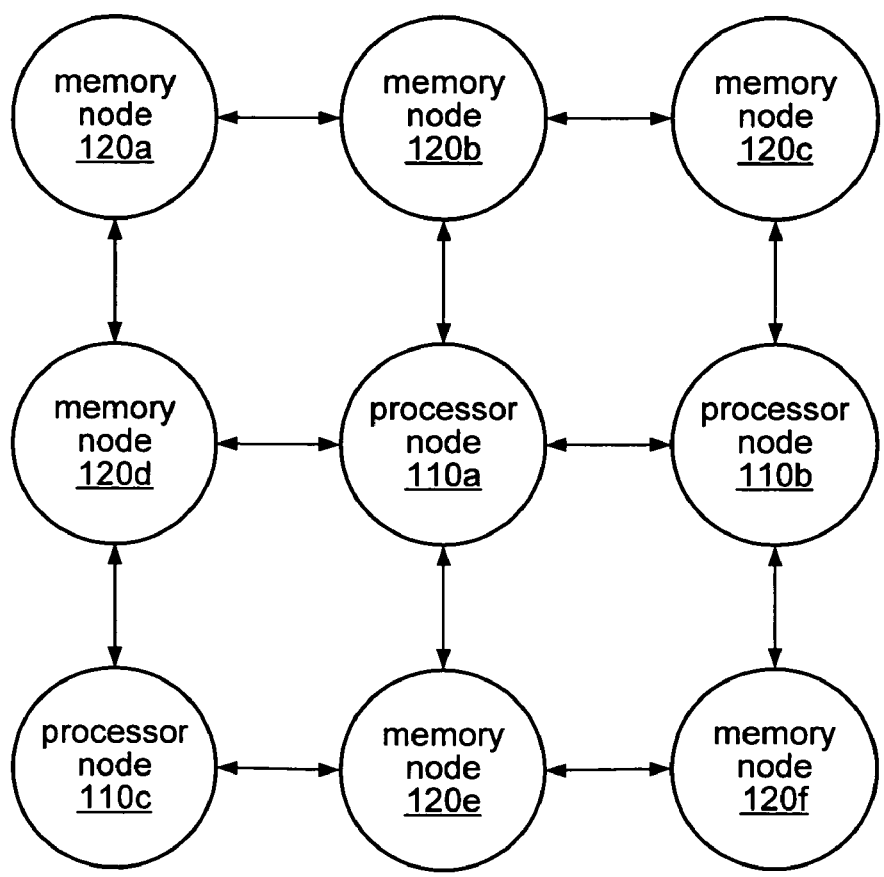
FIG. 4 illustrates a second embodiment of a communication network suitable for implementation of a proximity-based memory allocation technique.

Another embodiment of communication network 100 is illustrated by FIG. 4. In this example, a plurality of processor nodes 110 and a plurality of memory nodes 120 are connected via a grid topology. In one embodiment, a grid topology may include a two-dimensional network topology in which each node is connected to two neighboring nodes along each of one or more of the two dimensions. According to various embodiments, network 100 may be configured as a grid topology connecting a single processor node 110 and multiple memory nodes 120, multiple processor nodes 110 and multiple memory nodes 120, one or more hybrid nodes 130, or any other combination of processor nodes 110, memory nodes 120, hybrid nodes 130 and/or other nodes 140.

In various embodiments, network 100 may be configured as any network topology, including those described herein, or any other configuration of a single processor node 110 and multiple memory nodes 120; multiple processor nodes 110 and multiple memory nodes 120; one or more hybrid nodes 130; or any other combination of processor nodes 110, memory nodes 120, hybrid nodes 130 and/or other nodes 140. These configurations include, but are not limited to, a linear topology (in which connections are made only between each node and its neighbors in one dimension), a ring topology (similar to a linear topology, but in which the last node is connected to the first node), a torus topology (a multidimensional ring), a mesh topology (similar to a grid topology, but in which the last node on each row and/or column is connected to the first node of that row or column), a cube topology (similar to a grid, but in three dimensions) or a hypercube topology (in which multiple cube topologies are connected, such as with a fourth or higher dimension). In some embodiments, nodes connected via network 100 may have similar functionality to processor node 110, memory node 120, or hybrid node 130, but the functionality may be partitioned between nodes differently than in the examples described herein.

According to some embodiments, when a processor 110 connected to a communication network 100 requires some amount of memory for one of its processes, processor 110 may use a proximity-based memory allocation technique to find, and allocate to its process, the nearest and/or first memory node that can satisfy its request for memory. This proximity-based allocation technique may involve broadcasting a memory request packet to a subset of the nodes connected to network 100. As described above, the network interfaces 250 of the nodes connected to network 100 may implement the concept of time-to-live (TTL). In this case, a memory request packet may include a standard TTL field, which is decremented at each intermediate relaying node on the packet's way toward its final destination.

Figure 5:
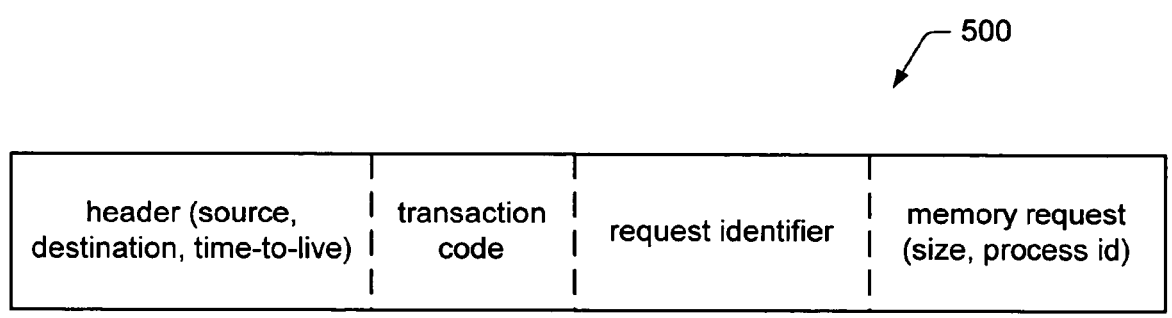
FIG. 5 illustrates the contents of an exemplary memory request packet, according to one embodiment.

One such embodiment is illustrated in FIG. 5 as memory request packet 500. In this example, the header of memory request packet 500 may include a source address field and a destination address field, in addition to a time-to-live (TTL) field. Also shown in FIG. 5, the body of memory request packet 500 may include a transaction code field, a request identifier field, and one or more memory request fields specifying details of the memory request (e.g., the process id associated with the memory request, the requested memory size, etc.). In some embodiments, the size of the request identification field may be selected such that it is long enough that a wrap-around problem (one resulting in reuse of a single request identifier for two current processes) may be extremely unlikely to occur during any reasonable period of system operation. For example, if the entire physical memory space is P bytes, and the minimum memory allocation unit (or page size) is m bytes, selecting the length of the request identification field in the packet body to be $\log(P/m)$ may prevent assignment of duplicate identifiers to two or more active processes. In other embodiments, the request identifier may include a portion representing the address or other identifier of the requesting processor, such as would be obtainable from the header of request packet 500, so that requests from different processors may not be confused with one another. In other words, the actual request identifier may be the concatenation of the source address in the packet header and the request identifier field in the packet body. In some embodiments, the processor may be configured such that it may not broadcast two different memory requests with the same request identifier. In some of these embodiments, the processor may record which memory allocations it has made, making it trivial for the processor to check the uniqueness of an identifier before including it in a new request packet 500.

In other embodiments, more, fewer or different fields may be included in the header or body of memory request packet 500, or similar fields may be partitioned differently between the packet header and body. In still other embodiments, information such as that included in request packet 500 may be partitioned into two or more packets, and these packets may be sent to one or more memory controllers at different times. For example, some details of the memory request, such as the process id, may not be sent to a memory controller until after memory has been allocated to that process.

In the example illustrated by FIG. 5, messages sent between a processor requesting memory and one or more memory controllers may be sent as unicast or broadcast messages, depending on the transaction code, as shown below in Table 1. According to some embodiments, if the transaction code indicates that the packet type is a broadcast message, the destination address may not be specified in the packet header, but if the transaction code indicates that the packet type is a unicast message, both the source and destination nodes may be specified in the packet header.

TABLE 1

| transaction code | operation | direction | packet type |
|---|---|---|---|
| 1 | request | from a processor to one or more memory controllers | broadcast |
| 2 | reply | from a single memory controller to a processor | unicast |
| 3 | confirmation acknowledgement (ack) | from a processor to a single memory controller | unicast |
| 4 | rejection negative acknowledgement (nack) | from a processor to a single memory controller | unicast |

As used herein, the term "memory controller" may refer to any memory controller 260 of a memory node 120, a hybrid node 130, or any other memory carrier node. In some embodiments, a proximity-based allocation scheme may be viewed as a client/server model, in which memory controllers are the servers; processors, such as processors 210 of processor nodes 110 or hybrid nodes 130, are the clients; and the service requests are demands for different amounts of physical memory. One embodiment of a proximity-based memory allocation technique is illustrated by the flow chart in FIG. 6. In this example, when a processor requires a block of physical memory, it may conduct a memory search with an ever-increasing search radius, until the requirement can be fulfilled.

To begin the memory search, a processor may set the search radius to one, assign a unique identifier to the request, and set a timeout parameter (tout) to an initial timeout value, t0, as shown in block 610. In some embodiments, this initial timeout value is a system-wide constant, T. One method for selecting an appropriate value for a system-wide constant, T, is described later.

In some embodiments, a memory request packet may be assembled that includes a packet header and a packet body, as illustrated by request packet 500 of FIG. 5. In other embodiments, more, fewer, or different fields may be included in the memory request packet, or similar information may be partitioned differently between the packet header and body or between two or more packets.

In this example, the processor may broadcast a request for memory, including the packet header described above, with the TTL field set to the search radius, as shown in block 620. The initial memory request packet header may, in some embodiments, also include a source address (e.g., the address of the requesting processor node). In some embodiments, the packet body may include a transaction code as shown in Table 1 (in this case, transaction code 1, indicating a broadcast memory request message from the processor to one or more memory controllers) and memory request details, including the amount of memory requested. In various embodiments, since the transaction code indicates that the packet type is a broadcast message, the destination address may or may not be specified in the packet header. The memory request may be broadcast only to the subset of nodes that are removed from the processor by the number of network hops equal to the value of the search radius, in some embodiments. In other embodiments, the memory request may be broadcast to the subset of nodes that are removed from the processor by no more than the value of the search radius, that is, to nodes at that number of network hops away or fewer. One method for broadcasting to a subset of nodes in a computer system is described in greater detail below.

The processor may start a timer, set to the initial timeout value described above, as illustrated by block 630. In this example, the processor may then wait for a reply from a node that can satisfy its request for memory. In some embodiments, a reply from a node that can satisfy the request may include an identifier that matches the request identifier in the initial memory request packet body.

In this example, the processor may or may not receive a reply from a memory node indicating that it can satisfy the request, as shown in block 640. If the processor does not receive a reply with an identifier matching the memory request identifier before the timer times out, the processor may increase the search radius and the timeout value, as illustrated by block 645, and then repeat the search beginning by broadcasting the memory request packet to another subset of nodes, as shown in block 620. In this example, the search radius is increased by one network hop for each iteration of the search. In other embodiments, the search radius may be increased by some other number of network hops. In some embodiments, all of the nodes previously broadcast to may be broadcast to again. In other embodiments, only nodes that are removed from the requesting processor by the new search radius may be broadcast to. As illustrated in block 645, the processor may increase the timeout value by a fixed amount for each iteration of the search, according to different embodiments. In some embodiments, this fixed amount is equal to the system-wide constant, T, referred to above, which may also be used as the initial timeout value. Choosing an appropriate value for T, may, in some embodiments, result in identifying the nearest available memory controller with the least overall response delay (e.g., communication delay plus processing delay). In some embodiments, the value of T may be chosen based on the configuration of the nodes in network 100. For example, in a regularly patterned configuration of nodes, the value of T may be chosen such that incrementing the timeout value by T for each iteration of the memory search may provide reasonable certainty that an additional set of nodes may receive, and have an opportunity to respond to, the memory request before the timeout.

If, at block 640 of this example, the processor receives a first reply from a node Y that includes an identifier matching the memory request identifier, the processor may send an acknowledgement (ack) in the form of a confirmation packet back to node Y, as illustrated by block 650. In some embodiments, this confirmation packet may include the same request identifier as the initial memory request packet body. The confirmation packet may be in the same format as the initial memory request packet, in some embodiments. In these embodiments, the packet header may include a source address (the address of the requesting processor node) and a destination address (the address of node Y), and the packet body may include a transaction code as shown in Table 1 (transaction code 3, indicating a unicast "ack" message from the processor to a single memory controller). The packet header may also include a TTL field, in some embodiments. This TTL field may be set to the maximum value for the network, in some embodiments. In other embodiments, it may be set to a value representing a number of network hops between the processor and node Y or to some other value. One method for determining a number of hops between a requesting processor and a replying node is described later.

In this example, the processor may or may not receive a reply from one or more other memory nodes indicating that they can satisfy its memory request, as illustrated by block 660. In some embodiments, if the processor does not receive another reply with an identifier matching that of the memory request, the memory allocation may be complete, as in block 670.

If, on the other hand, one or more additional nodes reply to the processor including an identifier matching that of the memory request, the processor may send a negative acknowledgement ("nack") packet to each of these additional nodes, as illustrated by block 665. In some embodiments, these "nack" packets may include the same request identifier as the initial memory request packet body. Each nack packet may be in the same format as the initial memory request packet, in some embodiments. In these embodiments, each packet header may include a source address (the address of the requesting processor node) and a destination address (the address of one of the additional nodes), and the packet body may include a transaction code as shown in Table 1 (transaction code 4, indicating a unicast "nack" message from the processor to a single memory controller). The packet header may also include a TTL field, in some embodiments. This TTL field may be set to the maximum value for the network, in some embodiments. In other embodiments, it may be set to a value representing a number of network hops between the processor and the destination node or to some other value.

In some embodiments, if the processor receives a reply from two or more nodes indicating that each can satisfy the memory request, the processor may select one of the nodes and send an acknowledgement packet to the selected node. In these embodiments, the processor may send a "nack" packet to each of the replying nodes other than the selected node. The selection may be based on any criteria, including, but not limited to, the order in which the replies were received and a true hop count between the processor and the replying memory nodes, according to different embodiments. For example, a memory node corresponding to a later-arriving reply having a lower hop count may be selected over a memory node corresponding to an earlier-arriving reply having a higher hop count, in some embodiments. An embodiment in which a true hop count between the processor and one or more replying memory nodes may be determined is described later.

Figure 7:
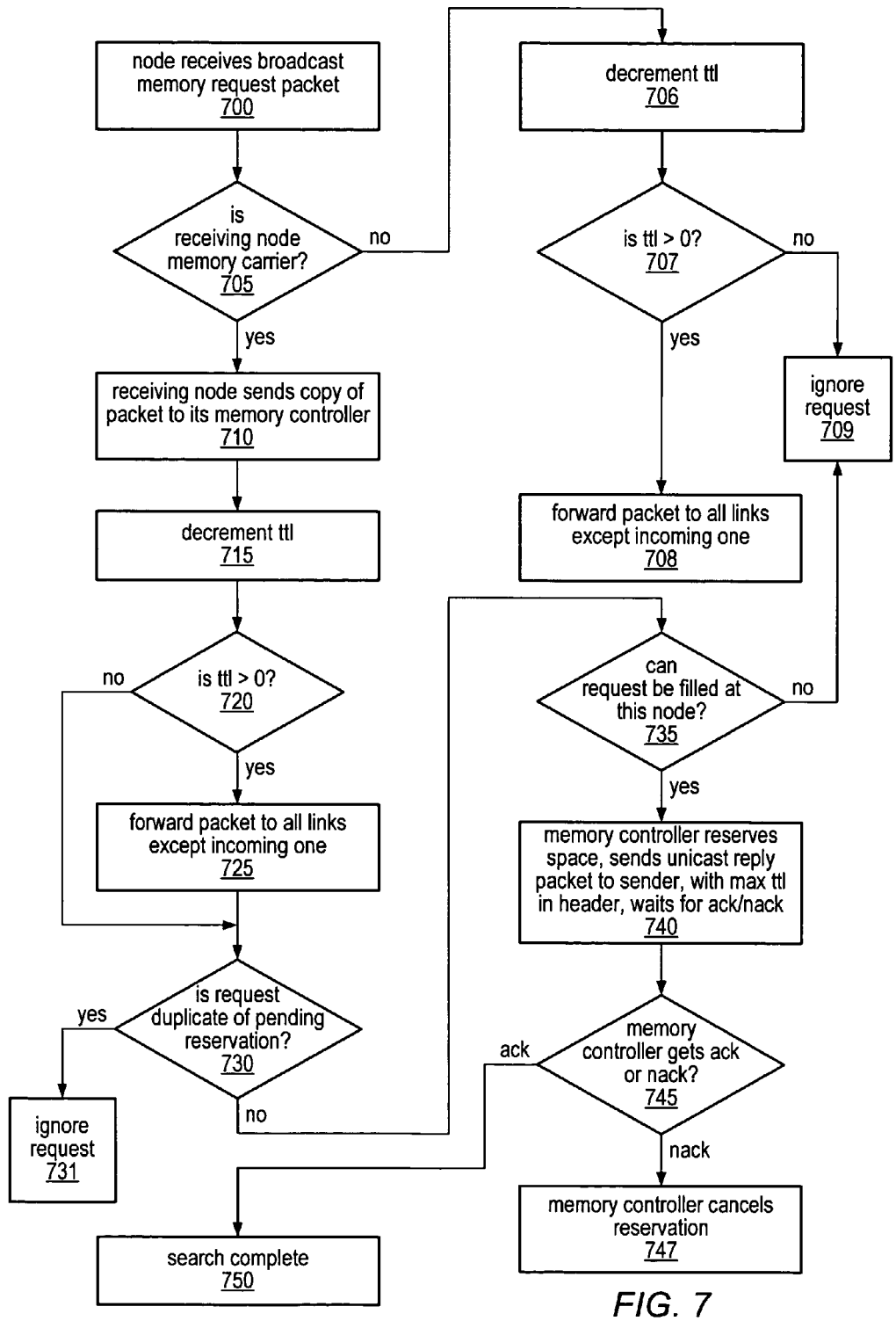
FIG. 7 is a flowchart illustrating one embodiment of a method for allocating memory according to a proximity-based allocation technique.

In one embodiment, illustrated by the flowchart of FIG. 7, a node receiving a broadcast memory request (also referred to as a "receiving node") may reply to the request itself, may forward the request to other nodes, or may ignore the request. In this example, a node may receive a broadcast memory request packet, such as memory request packet 500, as shown in block 700. In one embodiment, the memory request packet header may include a TTL value and a source address (the address of the requesting processor node), and the packet body may include a transaction code, such as shown in Table 1 (in this case, transaction code 1, indicating a broadcast memory request message from the processor to one or more memory controllers). In some embodiments, since the transaction code indicates that the packet type is a broadcast message, the destination address may or may not be specified in the packet header. In some embodiments, the packet body may specify the amount of memory requested.

A receiving node may respond differently to a received memory request depending on if it is a memory carrier or not, as illustrated by block 705. In this example, if the receiving node is not a memory carrier, it may respond by decrementing the TTL value of the memory request packet, as in block 706.

After decrementing the TTL value, in this example, the receiving node may determine if the TTL value is greater than zero, as in block 707. If the TTL value is not greater than zero, the packet has traveled its maximum allowed number of network hops and the receiving node may not forward it to any other nodes. In this case, the receiving node may ignore the request, as illustrated by block 709.

If, on the other hand, the decremented TTL value is greater than zero, the receiving node may be configured to forward the memory request packet to other nodes, such as in embodiments in which the network interface of the receiving node functions as a relaying carrier. For example, block 708 describes the receiving node forwarding the packet to all of its links in the communication network except for the one from which it received the request packet.

If the receiving node is a memory carrier, the node may, in some embodiments, send a copy of the memory request packet to its memory controller, as shown in block 710. In this example, the memory controller may then analyze the memory request packet to see if it can satisfy the request. Similar to the case in which the receiving node is not a memory carrier, the receiving node may first decrement the TTL value of the memory request packet, as in block 715.

After decrementing the TTL value, the receiving node may determine whether or not the decremented TTL value is greater than zero, as illustrated by block 720 in this example. In some embodiments, if the TTL value is not greater than zero, the packet has traveled its maximum allowed number of network hops and the receiving node may not forward it to any other nodes before continuing with its analysis.

If, on the other hand, the decremented TTL value is greater than zero, the receiving node may be configured to forward the memory request packet to other nodes before continuing with its analysis. For example, block 725 describes the receiving node forwarding the packet to each of its links in the communication network except for the one from which it received the request packet. In some embodiments, the operations illustrated by blocks 715-725 may be performed in parallel to those illustrated by blocks 730-747, rather than previous to these operations. For example, determining if a memory request can be filled and allocating memory to a process may be implemented by a separate hardware or software module of the memory controller than relaying the memory request packet to additional nodes.

The receiving node, if it is a memory carrier, may determine if the memory request is a duplicate of a pending (previously received) request for which the node has reserved at least the requested amount of memory, as illustrated by block 730. In some embodiments, if the memory request is a duplicate of a previously received request for which the node has reserved a portion of memory, the receiving node may be configured to ignore the request, as illustrated by block 731 in this example.

If the memory request is not a duplicate of a previously received request for which the node has reserved a portion of memory, the receiving node may determine if it can satisfy the memory request, as shown in block 735. In some embodiments, if the receiving node cannot satisfy the request (e.g., if the receiving node does not include an available portion of memory at least as large as the amount of memory requested), the receiving node may ignore the request, as in block 709.

If, in some embodiments, the receiving node determines that it can satisfy the memory request, the receiving node may respond by reserving a portion of memory at least as large as the amount of memory requested, sending a unicast reply packet to the requesting node, and waiting for an acknowledgement, as described by block 740. In some embodiments the actual amount of memory reserved may depend on the configuration of the memory itself, such as if it may only be allocated in blocks of certain predetermined sizes. In some embodiments, the reply may be a packet in the same format as the initial memory request packet. In these embodiments, the packet header may include a source address (the address of the receiving node), a destination address (the address of the requesting processor node), and a TTL value, and the packet body may include a transaction code as shown in Table 1. In this example, the transaction code value would be 2, indicating a unicast reply from a single memory controller to the processor. In some embodiments, the TTL field of the reply may be set to the maximum TTL value for the network. In other embodiments, the TTL field may be set to a value representing an actual number of network hops between the receiving node and the processor or to some other value. Reserving a portion of memory may, in some embodiments, involve updating a registry or table indicating which portions of memory are available and which are currently allocated to various processes. For example, the request identifier, process id, and/or an identifier of the requesting processor may be recorded in the registry along with the amount of memory reserved and the starting and/or ending address of the memory reserved. In some embodiments, such a registry may be local to the memory controller or stored in the physical memory itself, or it may be located elsewhere, such as on another node connected to network 100.

Once the receiving node has reserved a portion of memory and replied to the requesting processor node, it may, in some embodiments, be configured to wait for an acknowledgement from the processor indicating that its memory will be allocated to the process for which the processor requested memory. In some embodiments, the receiving node may receive an acknowledgement packet or a negative acknowledgement packet from the processor, as illustrated by block 745. If the receiving node receives an acknowledgement packet, it may be in the same format as the initial memory request packet, and may include the elements described above for the acknowledgement (or "ack") packet sent from the processor. In some embodiments, once the receiving node receives an acknowledgement, the reserved memory is allocated to the requesting processor and the memory allocation is complete, as in block 750.

If the receiving node does not receive an acknowledgement from the processor, it may, in some embodiments, receive a negative acknowledgement (or "nack") from the processor. In this example, the negative acknowledgement packet may be in the same format as the initial memory request packet, and may include the elements described above for the negative acknowledgement ("nack") packet sent from the processor.

In some embodiments, if the receiving node receives a nack packet from the processor, the receiving node is configured to respond by canceling the reservation of memory corresponding to the initial memory request, as in block 747. In one embodiment, canceling the reservation may involve updating a registry or table indicating which portions of memory are available and which are currently allocated to various processes, as described above.

In some embodiments, if a processor wants to release previously allocated physical memory for any reason, it may send a reject nack in a unicast packet, with the original request identifier, back to the corresponding memory controller of the memory that was allocated. In such embodiments, the receiving node, upon receiving the nack packet, may cancel the reservation and free that portion of memory for use by other processes, as described above.

To further illustrate proximity-base memory allocation, two examples of proximity-based memory allocation are described in detail below. The first example is based on the hierarchical tree topology illustrated in FIG. 3. For this example, Table 2 (below) lists the amount of memory available on each node of the network illustrated in FIG. 3 at the time when one of the processor nodes 110 determines that one of its processes requires a block of memory.

TABLE 2

| memory node | 120a | 120b | 120c | 120d | 120e | 120f |
|---|---|---|---|---|---|---|
| available memory | 11 Mb | 1 Mb | 2 Mb | 3 Mb | 0 Mb | 9 Mb |

In this example, one of the processes executing on processor node 110c requires an allocation of 10 Mb of memory. According to some embodiments, such as the ones discussed above and illustrated in FIGS. 6 and 7, processor 210 of processor node 110c may broadcast a memory request packet, such as memory request packet 500, in which TTL equals 1 and the timeout field is set to an initial timeout value, t0. Because the search radius is one network hop removed from processor node 110c, this first broadcast packet reaches memory node 120c, memory node 120d, and processor node 110d. In this example, none of these nodes can satisfy the request for 10 Mb of memory, and processor node 110c times out before receiving a reply.

In this example, processor 210 of processor node 110c may send a second broadcast packet in which TTL equals 2 and the timeout value is larger than the initial timeout value. Because the search radius is now two network hops removed from processor node 110c, this second broadcast packet again reaches memory node 120c, memory node 120d, and processor node 110d, and also reaches processor node 110a, memory node 120a, memory node 120b, processor node 110b, memory node 120e, and memory node 120f. In this example, memory node 120a can satisfy the request, so memory node 120a reserves at least 10 Mb of memory and sends a reply to processor node 110c including the request identifier from the memory request packet. Processor node 110c then sends an ack unicast packet to memory node 120a. Since no other nodes replied to the memory request, no nack packets are sent by processor node 110c.

A second example of proximity-based memory allocation is based on the grid topology illustrated in FIG. 4. For this example, Table 3 (below) lists the amount of memory available on each node of the network illustrated in FIG. 4 at the time when one of the processors determines that it needs to allocate a block of memory to one of its processes.

TABLE 3

| memory node | 120a | 120b | 120c | 120d | 120e | 120f |
|---|---|---|---|---|---|---|
| available memory | 12 Mb | 0 Mb | 0 Mb | 0 Mb | 4 Mb | 0 Mb |

In this example, one of the processes executing on processor node 110a requires an allocation of 10 Mb of memory. According to some embodiments, such as the ones described by FIGS. 6 and 7, processor node 110a may broadcast a memory request packet, such as memory request packet 500, in which TTL equals 1 and the timeout field is set to an initial timeout value, t0. Because the search radius is one network hop removed from processor node 110a, this first broadcast packet reaches memory node 120b, memory node 120d, memory node 120e, and processor node 110b. In this example, none of these nodes can satisfy the request for 10 Mb of memory, and processor node 110a times out before receiving a reply.

In this example, processor node 110a may then send a second broadcast packet in which TTL equals 2 and the timeout value is larger than the initial timeout value. Because the search radius is now two network hops removed from processor node 110a, this second broadcast packet again reaches memory node memory node 120b, memory node 120d, memory node 120e, and processor node 110b, and also reaches memory node 120a, memory node 120c, processor node 110c, and memory node 120f.

In this example, memory node 120a can satisfy the request, so memory node 120a reserves at least 10 Mb of memory and sends a reply to processor node 110a including the request identifier from the memory request packet. Processor node 110a then sends an ack unicast packet to memory node 120a. Since no other nodes replied to the memory request, no nack packets are sent by processor node 110a.

Other embodiments of proximity-based memory allocation may include variations of the search described above and illustrated by FIGS. 6 and 7. For example, in some embodiments, instead of relying on a time-to-live (TTL) value, a requesting processor may send out a broadcast memory request and relaying carriers may forward it without regard to a TTL value. This may result in a larger number of request, reply, acknowledgement, and/or negative acknowledgement packets being sent between nodes, in some embodiments. In such embodiments, the requesting processor may receive multiple favorable replies from nodes at varying numbers of network hops away. In these cases, the requesting processor may select a memory to allocate to its process based on the order of the replies received, the number of network hops between the requesting processor and each of the replying nodes, or on some other criteria. The processor may send an ack unicast packet to the selected node and may send a nack unicast packet to each of the other replying nodes, in some embodiments.

Figure 6:
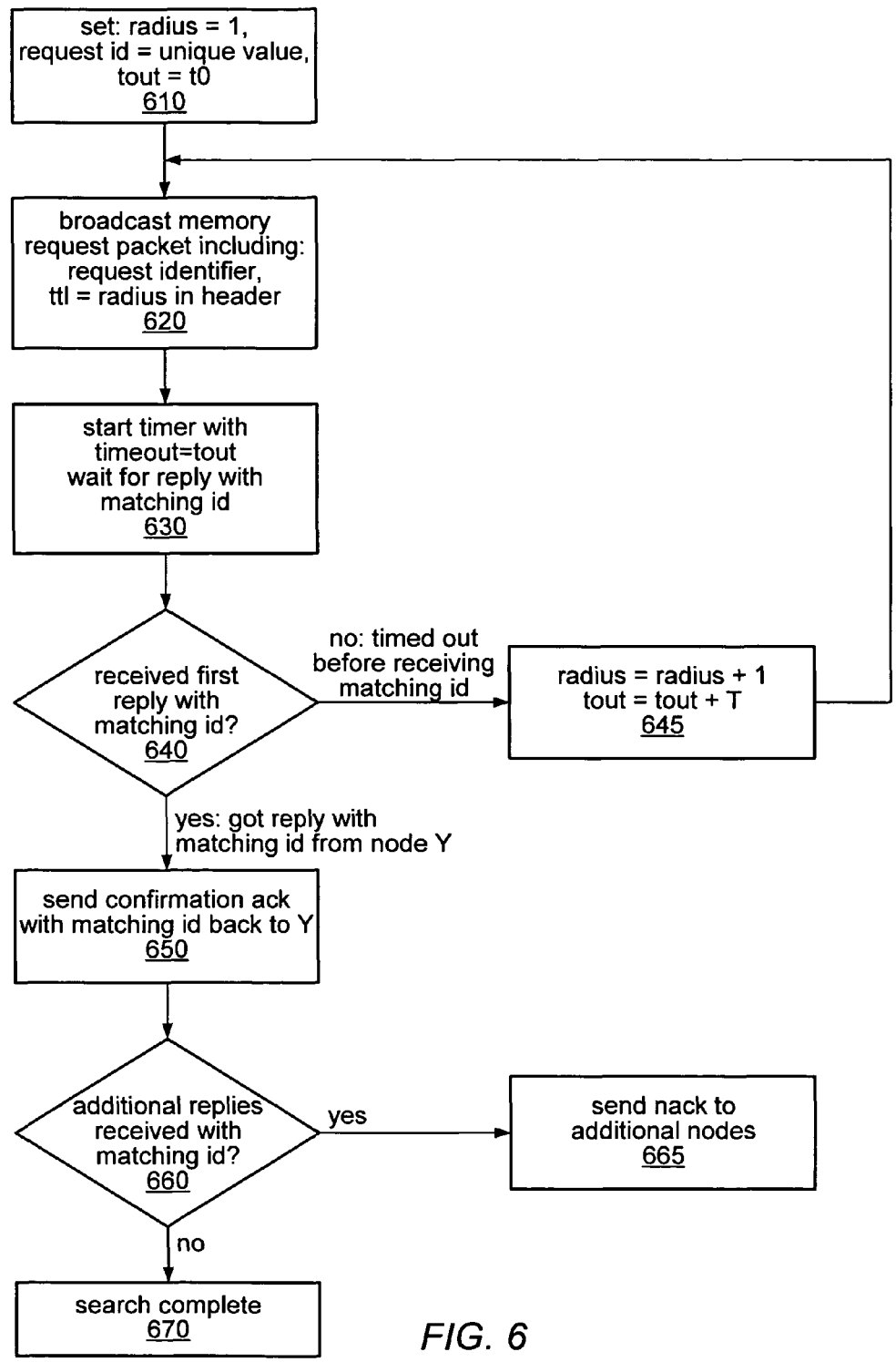
FIG. 6 is a flowchart illustrating one embodiment of a proximity-based memory allocation technique.
Figure 8:
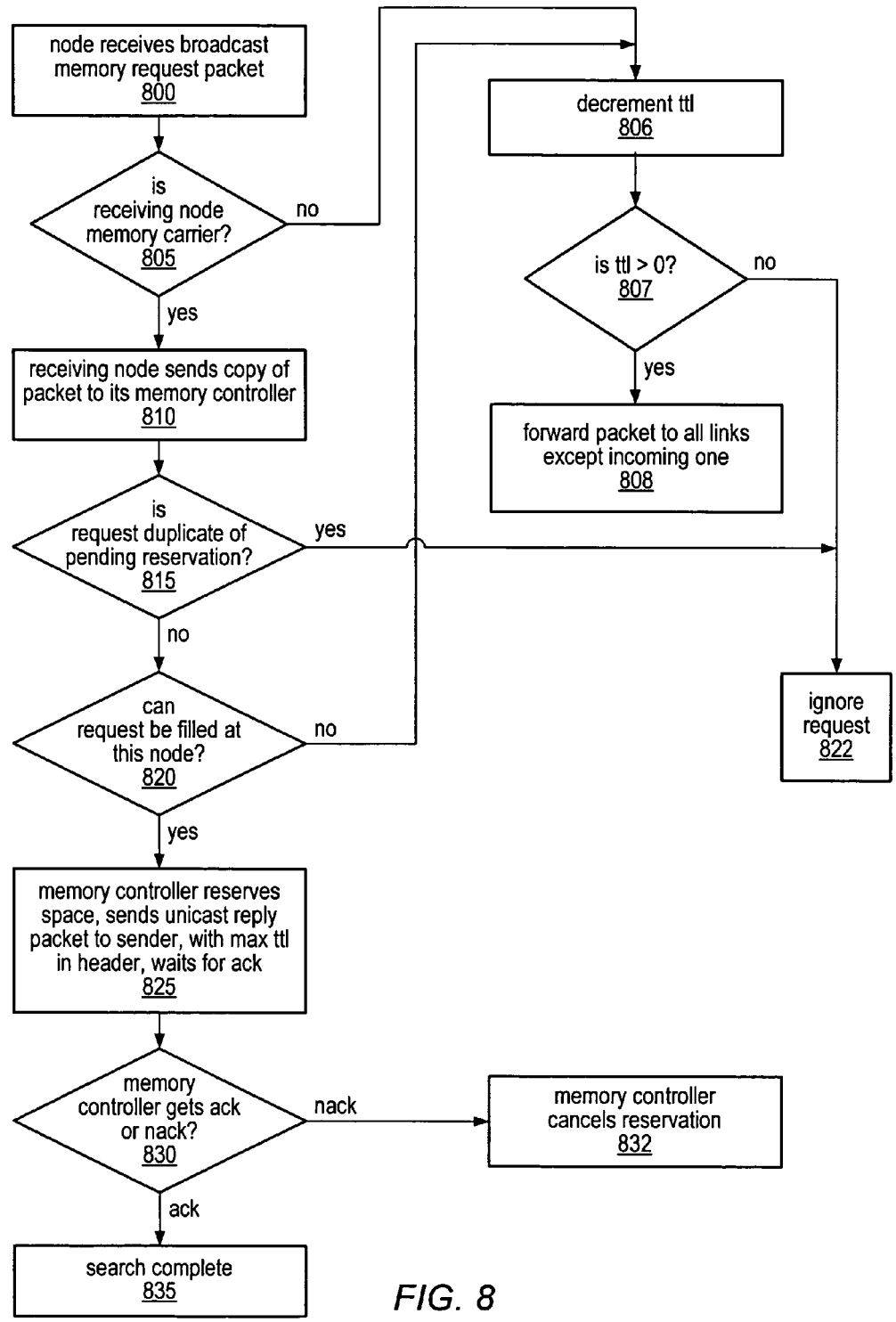
FIG. 8 is a flowchart illustrating a second embodiment of a method for allocating memory according to a proximity-based allocation technique.

In other embodiments, the total number of request packets sent between nodes may be less than the number of packets generated by the embodiment illustrated by FIGS. 6 and 7. For example, in one embodiment, a receiving node that is capable of satisfying a received memory request may refrain from forwarding the request packet to other nodes. One such embodiment is illustrated by FIG. 8 and described below.

In this example, a node may receive a broadcast memory request packet, such as memory request packet 500, as shown in block 800. In one embodiment, the memory request packet header may include a TTL value and a source address (the address of the requesting processor node), and the packet body may include a transaction code, such as shown in Table 1 (in this case, transaction code 1, indicating a broadcast memory request message from the processor to one or more memory controllers). In some embodiments, since the transaction code indicates that the packet type is a broadcast message, the destination address may or may not be specified in the packet header. In some embodiments, the packet body may specify the amount of memory requested.

A receiving node may respond differently to the request depending on if it is a memory carrier or not, as illustrated by block 805. In this example, if the receiving node is not a memory carrier, it may respond by decrementing the TTL value of the memory request packet, as in block 806.

After decrementing the TTL value, in this example, the receiving node may determine if the TTL value is greater than zero, as in block 807. If the TTL value is not greater than zero, the packet has traveled its maximum allowed number of network hops and the receiving node may not forward it to any other nodes. In this case, the receiving node may ignore the request, as illustrated by block 822.

If, on the other hand, the decremented TTL value is greater than zero, the receiving node may be configured to forward the memory request packet to other nodes. For example, block 808 describes the receiving node forwarding the packet to all of its links in the communication network except for the one from which it received the request packet.

If the receiving node is a memory carrier, that is, if it includes memory and/or a memory controller, the node may, in some embodiments, analyze the memory request packet to see if it may satisfy the request. In this example, unlike the case in which the receiving node is not a memory carrier, the receiving node may first send a copy of the request packet to its memory controller, as described by block 810.

The receiving node, if it is a memory carrier, may determine if the memory request is a duplicate of a pending (previously received) request for which the node has reserved at least the requested amount of memory, as illustrated by block 815. In some embodiments, if the memory request is a duplicate of a previously received request for which the node has reserved a portion of memory, the receiving node may be configured to ignore the request, as illustrated by block 822.

If the memory request is not a duplicate of a previously received request for which the node has reserved a portion of memory, the receiving node may determine if it can satisfy the memory request, as shown in block 820. In some embodiments, if the receiving node cannot satisfy the request, that is, if the receiving node does not include an available portion of memory at least as large as the amount of memory requested, the receiving node may respond by determining whether to forward the request to additional nodes. Determining whether to forward the request may, in some embodiments, involve decrementing the TTL value of the memory request packet, as shown in block 806.

After decrementing the TTL value, the receiving node may determine whether or not the decremented TTL value is greater than zero, as illustrated by block 807. In some embodiments, if the TTL value is not greater than zero, the packet has traveled its maximum allowed number of network hops and the receiving node may not forward it to any other nodes. In this case, the receiving node may ignore the request, as illustrated by block 822.

If, on the other hand, the decremented TTL value is greater than zero, the receiving node may be configured to forward the memory request packet to other nodes. For example, block 808 describes the receiving node forwarding the packet to all of its links in the communication network except for the one from which it received the request packet.

If, in some embodiments, the receiving node determines that it can satisfy the memory request, the receiving node may respond by reserving a portion of memory at least as large as the amount of memory requested, sending a unicast reply packet to the requesting node, and waiting for an acknowledgement, as described by block 825. In some embodiments the actual amount of memory reserved may depend on the configuration of the memory itself, such as if it may only be allocated in blocks of certain predetermined sizes. In some embodiments, the reply may be a packet in the same format as the initial memory request packet. In these embodiments, the packet header may include a source address (the address of the receiving node), a destination address (the address of the requesting processor node), and a TTL value, and the packet body may include a transaction code as shown in Table 1. In this example, the transaction code value would be 2, indicating a unicast reply from a single memory controller to the processor. In some embodiments, the TTL field of the reply may be set to the maximum TTL value for the network. In other embodiments, the TTL field may be set to a value representing an actual number of network hops between the receiving node and the processor or to some other value. In some embodiments, reserving a portion of memory may involve updating a registry or table indicating which portions of memory are available and which are currently allocated to various processes, as described above.

Once the receiving node has reserved a portion of memory and replied to the requesting processor node, it may, in some embodiments, be configured to wait for acknowledgement from the processor indicating that its memory will be allocated to the process for which the processor requested memory. In some embodiments, the receiving node may receive an acknowledgement packet or a negative acknowledgement packet from the processor, as illustrated by block 830. If the receiving node receives an acknowledgement packet, it may be in the same format as the initial memory request packet, and may include the elements described above for the acknowledgement (or "ack") packet sent from the processor. In some embodiments, once the receiving node receives an acknowledgement, the reserved memory may be allocated to the requesting processor and the memory allocation may be complete, as in block 835.

If the receiving node does not receive an acknowledgement from the processor, it may, in some embodiments, receive a negative acknowledgement (or "nack") from the processor. In this example, the negative acknowledgement packet may be in the same format as the initial memory request packet, and may include the elements described above for the negative acknowledgement ("nack") packet sent from the processor.

In some embodiments, if the receiving node receives a nack packet from the processor, the receiving node may be configured to respond by canceling the reservation of the memory corresponding to the initial memory request, as in block 832. Canceling the reservation may, in some embodiments, involve updating a registry or table indicating which portions of memory are available and which are currently allocated to various processes, as described above.

In one embodiment, a requesting processor may be configured to determine a true hop count between itself and a receiving node that is capable of satisfying the processor's memory request. In one such embodiment, the reply packet from the receiving node to the requesting processor, when sent, may include the TTL field set to the maximum value for the system. In this example, the TTL value may be decremented by each relaying node as the packet travels from the receiving node to the requesting processor. Therefore, the requesting processor may be able to determine a hop count between the receiving node and the requesting processor by examining the value of the TTL field when it receives the reply. In this example, the hop count may be the difference between the maximum TTL value for the system and the value remaining in the TTL field when the requesting processor receives the packet. In another embodiment, the reply packet from the receiving node, when sent, may include the TTL field set to zero. In this example, the TTL value may be incremented by each relaying node as the packet travels from the receiving node to the requesting processor. Therefore, the requesting processor may be able to determine a hop count between the receiving node and the requesting processor by examining the value of the TTL field, which will correspond to the number of hops traveled.

In some embodiments, there may be more than one path from the requesting processor to a receiving node; therefore there may be two or more possible hop count values for a message traveling from the receiving node to the requesting node and vice versa. In some embodiments, the requesting processor may select which memory to allocate to its process by choosing the memory corresponding to the reply that traveled the fewest hops from among multiple replies received within its timeout period. An embodiment such as this may be used to find the closest memory with the least communication-only delay.

Proximity-based memory allocation, as described herein, may be applied to computer systems with memory architectures other than the distributed, shared memory (DSM) system described above. For example, in some embodiments, a virtual shared memory may be overlaid on top of a distributed architecture. In this example, a virtual address of a block of memory may be translated into the physical address of a block of memory that is allocated to a process. In some cases, the physical block of memory may be non-local memory (e.g., it may be implemented on a node other than the one including the requesting processor). In other cases, the physical block of memory allocated may be local to the requesting processor. In some embodiments, the virtual address of the allocated memory may correspond to an address assigned to the address space of the requesting processor, whether the physical memory is local or non-local to the requesting processor.

In some embodiments, if a processor's request for memory cannot be fulfilled by any memory controller (i.e., none of the memory controllers have enough free space to satisfy the request), the processor may be configured to break up its memory request into multiple requests for smaller blocks of memory and to issue memory requests for each of these smaller blocks of memory using a proximity-based memory allocation technique, as described herein.

In some embodiments, the nodes of a NUMA shared memory multiprocessor computer system may be configured to detect or respond to various error conditions. For example, in one embodiment, if a processor fails after allocating memory on another node, or a memory controller fails after reserving memory for a processor, the recovering entity (either the processor or the memory controller) may be configured to broadcast a special "rebooting" message to all of the nodes in the system, so that stale memory allocations or reservations may be discarded or canceled. In some embodiments, such a "rebooting" message may only be unicast to the affected nodes of the system.

In another embodiment, a heartbeat protocol may be maintained between each pair of allocation clients (in this case, memory controllers) and servers (requesting processors). For example, a heartbeat packet may be unicast back and forth between each pair of allocation clients and servers at predefined intervals. In such embodiments, failures may be detected in a timely manner if the heartbeat protocol between any pair is interrupted.

In yet another embodiment, a version number may be embedded within the request identifier described above. In this case, if a receiving node receives a request packet in which the request identifier is the same as the request identifier of a previously received request packet except that it includes a new version number, the receiving node may determine that an error condition has occurred. If the receiving node determines that an error condition has occurred, it may be configured to cancel all memory reservations corresponding to the previous request that included an older version number.

In some embodiments, as described above, the memory controller of each memory node/carrier may be configured to keep track of which processor has allocated what portion(s) of its memory. In other embodiments, memory nodes/carriers may not be configured to keep track of memory allocations. In some embodiments, a particular portion of each memory may be used as the storage area for its allocation bookkeeping information. In other embodiments, allocation bookkeeping information may be stored elsewhere on the corresponding memory node/carrier, such as in a registry, table, or database, or may be stored on one or more other nodes connected via network 100. This bookkeeping information may be accessed by the memory controller of the corresponding node or by a processor configured to control and track memory allocation.

In some embodiments, one or more processors on one or more nodes connected via network 100 may be configured to manage allocation bookkeeping information. In some embodiments, tracking of memory allocations within a plurality of memory nodes/carriers may be distributed among a group of processors on one or more nodes connected to those memory nodes/carriers via network 100. In still other embodiments, one or more processors may be dedicated to memory management purposes; e.g., they may run single-threaded kernel processes that do nothing except handle memory requests, on memories under their control, from other general-purpose processors. Proximity-based memory allocation, as described herein, may be employed within any of these embodiments in fundamentally the same fashion, whether the logic to determine if a memory can satisfy a request, or the logic to determine when and where to send or relay a packet, is part of a memory node 120 or part of another node, such as a processor node 110, a hybrid node 130, or some other node 140.

Proximity-based memory allocation, as described herein, may be implemented in hardware (such as in one or more integrated circuits or printed circuit boards), software (executing on a processor 210 or another suitable device), or a combination of hardware and software, according to various embodiments. For example, a function for determining if the identifier included in a reply packet matches the request identifier of a memory request packet may be implemented in hardware, using an electronic circuit configured to compare the states of two or more signals, or in software, using program instructions for comparing the values of two registers or other data structures. Similarly, implementation of the time-to-live feature of a proximity-based memory allocation search may be done using hardware, such as circuits configured to decrement the contents of a register and compare its value to zero, or in software, using program instructions configured to decrement a variable and compare its value to zero. Proximity-based memory allocation may be partially or totally automated, in some embodiments, such that a program executing in a computer system employing proximity-based memory allocation may not include specific instructions for allocating nearby memory. In such cases, the use of proximity-based allocation may not require input or knowledge on the part of a programmer, as the operating system, or other software or hardware, may be configured to allocate nearby memory to each program at run-time.

In some embodiments, program instructions may be configured to implement proximity-based memory allocation, as described herein and according to various embodiments. A computing system capable of implementing proximity-based memory allocation may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Figure 9:
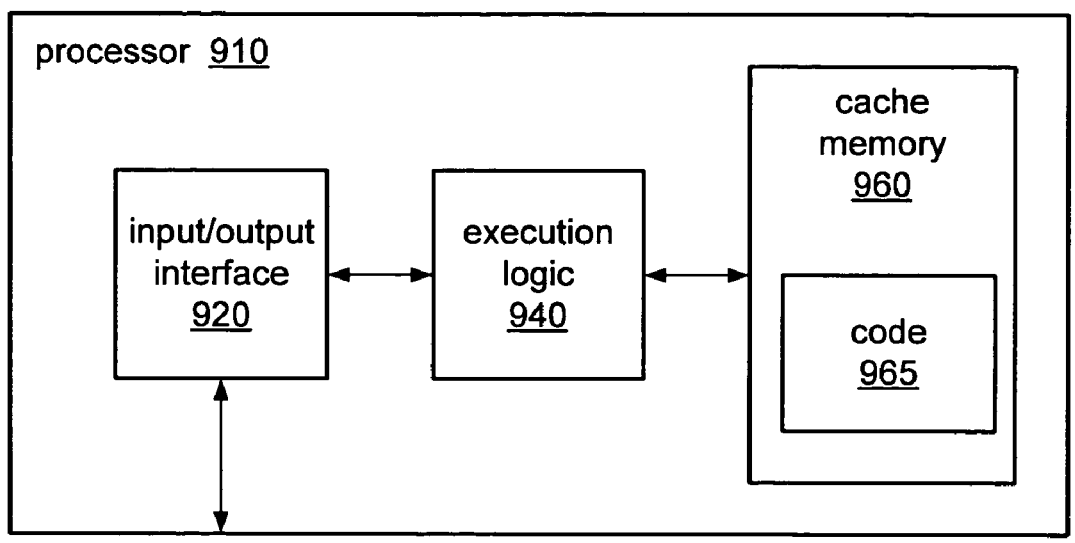
FIG. 9 illustrates one embodiment of a processor suitable for implementing proximity-based memory allocation.

In some embodiments, proximity-based memory allocation may be implemented in a processor, such as processor 910 of FIG. 9. In the example illustrated by FIG. 9, processor 910 may comprise an input/output interface 920, execution logic 940, and a cache memory 960. In other embodiments, processor 910 may include multiple input/output interfaces 920 and/or cache memories 960, and execution logic 940 may be partitioned into two or more blocks of logic according to its functionality or other attributes.

In some embodiments, execution logic 940 may include hardware, such as electronic circuits, configured to implement proximity-based memory allocation, as described herein. Execution logic 940 may also include logic configured to implement other functionality of processor 910, e.g., address calculation, instruction fetch and execution, arithmetic calculations, Boolean calculations and manipulations, digital signal processing, or any other functionality of a general-purpose or special-purpose processor, according to various embodiments. For example, execution logic 940 may be configured to allow processor 910 to implement any of various instruction set architectures, such as x86, SPARC, PowerPC, etc. In some embodiments, execution logic 940 may be configured to implement a single CPU core, multiple CPU cores, or any combination of one or more general-purpose CPU cores and special-purpose cores (e.g., digital signal processors, hardware accelerators, co-processors, etc.) In various embodiments, execution logic 940 may be configured to implement a superscalar architecture or may be configured to implement multi-threading.

In some embodiments, proximity-based memory allocation, as described herein, may be implemented by program instructions stored in cache memory 960 and executed by processor 910. Such program instructions are shown in FIG. 9 as code 965 stored within cache memory 960. In still other embodiments, proximity-based memory allocation may be implemented by program instructions stored in another type of computer-accessible medium, which may or may not be separate from processor 910, and executed by processor 910. Examples of such computer-accessible media include, but are not limited to, installation media, e.g., a CD-ROM or floppy disk, computer system memory such as DRAM, SRAM, EDO RAM, SDRAM, DDR SDRAM, Rambus RAM, flash memory, etc., or non-volatile memory such as a magnetic media, e.g., a hard drive or optical storage. In one embodiment, program instructions configured to implement proximity-based memory allocation may be stored in memory co-located with processor 910, such as a memory 220 on a processor node 110 or a hybrid node 130. In some embodiments, the operations and functions comprising proximity-based memory allocation may be partitioned between local memory, such as cache memory 960 or memory local to a processor or hybrid node comprising processor 910, and non-local memory. Proximity-based memory allocation may be implemented in any of various programming languages or methods, according to various embodiments.

In some embodiments, input/output interface 920 may be configured to couple processor 910 directly to a computer system network, such as network 100. In other embodiments, input/output interface 920 may be configured to couple processor 910 to a network interface, such as a network interface 250 on a processor node 110 or a hybrid node 130. In some embodiments, input/output interface 920 may be configured to implement one or more of various interface or network standards, e.g., Peripheral Component Interconnect (PCI), Ethernet, HyperTransport (HT), Infiniband, or any variant or successor of these or other suitable input/output protocols. In some embodiments, input/output interface 920 may incorporate some or all of the functionality of network interface 250. In other embodiments, some or all of the functionality of input/output interface 920 may be included in network interface 250, rather than in processor 910.

The functionality of step referred to herein may correspond to the functionality of hardware or software modules or portions of hardware or software modules, according to various embodiments. The operations referred to herein may be modules or portions of modules (e.g., software, firmware, or hardware modules), according to various embodiments. For example, software modules implementing proximity-based memory allocation may include source, script, batch or other executable files, or combinations and/or portions of such files. In some embodiments, software modules implementing proximity-based memory allocation may include a computer program or subroutines thereof encoded on one or more computer accessible media.

Additionally, those skilled in the art will recognize that the boundaries between modules and/or components are merely illustrative and alternative embodiments may merge modules/components or impose an alternative decomposition of functionality of modules and components. For example, the modules discussed herein may be decomposed into sub-modules to be executed as multiple computer processes or to be implemented as multiple hardware components (such as integrated circuits and/or printed circuit boards). Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention, according to various alternate embodiments.

Thus, the flows described herein, the operations thereof and modules therefore may be implemented in hardware on a computer system configured to execute the operations of the flows and/or may be implemented in software executed by the computer system from computer accessible media, according to various embodiments. In some embodiments, the flows may be embodied in a machine-readable and/or computer accessible medium for configuring a computer system to execute the flows, as described above. Thus, one or more software modules implementing all or part of a proximity-based memory allocation method may be stored within and/or transmitted to a computer system memory to configure the computer system to perform the functions of the module(s), according to various embodiments.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising:
   a processor node comprising a processor and a network interface;
   a plurality of memory nodes, wherein each memory node comprises a memory and a network interface;
   a communication network configured to interconnect said processor node and said plurality of memory nodes via said network interfaces according to a network topology, wherein each of said memory nodes is removed from said processor node by a respective number of network hops according to said network topology;
   wherein said processor node is configured to:
      broadcast a packet comprising a memory request to a first subset of said plurality of memory nodes, wherein each memory node of said first subset of memory nodes is removed from said processor node by no more than a given number of network hops;
      determine whether one or more of said first subset of memory nodes has sent a reply to said processor node indicating that it can satisfy said memory request; and
      in response to determining that no memory node of said first subset of memory nodes has sent a reply to said processor node indicating that it can satisfy said memory request:
         increase said given number of network hops; and
         broadcast a packet comprising said memory request to a second subset of said plurality of memory nodes, wherein each memory node of said second subset of memory nodes is removed from said processor node by no more than said increased given number of network hops.

2. The system of claim 1, wherein said processor node is further configured to:
   determine whether one or more of said second subset of memory nodes has sent a reply to said processor node indicating that it can satisfy said memory request; and
   in response to determining that no memory node of said second subset of memory nodes has sent a reply to said processor node indicating that it can satisfy said memory request, continue to increase said given number of network hops and to broadcast a packet comprising said memory request to a corresponding subset of said plurality of memory nodes, wherein each memory node of said corresponding subset of memory nodes is removed from said processor node by no more than said increased given number of network hops, until at least one of the following occurs: one or more of said plurality of memory nodes indicates that it can satisfy said memory request in response to receiving a packet comprising said memory request, said processor node has broadcast a packet comprising said memory request to each of said plurality of memory nodes, or a time-out condition has been met.

3. The system of claim 1, wherein said processor node is one of a plurality of processor nodes, wherein each of said plurality of processor nodes comprises a processor and a network interface, and wherein each of said plurality of processor nodes is coupled to said communication network via said network interfaces according to said network topology.

4. The system of claim 3, wherein at least one of said plurality of processor nodes further comprises a memory.

5. The system of claim 1, wherein said network topology comprises one or more of: a linear topology, a hierarchical tree topology, a star topology, a mesh topology, a grid topology, a ring topology, a toroidal topology, a cube topology or a hypercube topology.

6. The system of claim 1, wherein said given number of network hops is one.

7. The system of claim 1, wherein said increasing said given number of network hops comprises adding one to said given number of network hops.

8. The system of claim 1, wherein said memory request comprises a requested memory size, a request identifier, and a time-to-live indicator.

9. The system of claim 8, wherein a particular one of the plurality of memory nodes is configured to:
   receive said memory request; and
   if it is able to satisfy said memory request:
      reserve a portion of memory at least as large as the requested memory size; and
      send a reply to said processor node to indicate that the particular one of the plurality of memory nodes can satisfy said memory request, wherein the reply comprises the request identifier.

10. The system of claim 1, wherein said processor node is further configured to send an acknowledgement to a particular one of the plurality of memory nodes in response to receiving a reply from said particular one of the plurality of memory nodes indicating that it can satisfy said memory request.

11. The system of claim 1, wherein, in response to receiving replies from each of two or more of said plurality of memory nodes indicating that it can satisfy said memory request, said processor node is further configured to:
   select a particular one of said two or more memory nodes;
   send an acknowledgement to said particular memory node; and
   send a negative acknowledgement to each of said two or more memory nodes other than said particular memory node.

12. A method, comprising:
   a processor node broadcasting a packet comprising a memory request to a first subset of a plurality of memory nodes, wherein said plurality of memory nodes and said processor node are interconnected via a communication network according to a network topology, and wherein each memory node of said first subset of memory nodes is removed from said processor node by no more than a given number of network hops according to said network topology; and in response to determining that none of the memory nodes of said first subset of memory nodes has sent a reply to said processor node indicating that it can satisfy said memory request, said processor node:

increasing said given number of network hops; and broadcasting a packet comprising said memory request to a second subset of said plurality of memory nodes, wherein each memory node of said second subset of memory nodes is removed from said processor node by no more than said increased given number of network hops.

13. The method of claim 12, wherein said given number of network hops is one.

14. The method of claim 12, wherein said increasing said given number of network hops comprises adding one to said given number of network hops.

15. The method of claim 12, wherein said memory request comprises a requested memory size, a request identifier, and a time-to-live indicator.

16. The method of claim 12, further comprising:

a particular one of said plurality of memory nodes indicating that it can satisfy said memory request in response to receiving said memory request; and said processor node sending an acknowledgement to the particular memory node.

17. The method of claim 12, further comprising:

each of two or more of said plurality of memory nodes indicating that it can satisfy said memory request in response to receiving said memory request;

said processor node selecting a particular one of said two or more memory nodes;

said processor node sending an acknowledgement to said particular memory node; and said processor node sending a negative acknowledgement to each of said two or more memory nodes other than said particular memory node.

18. A processor node, comprising:

a processor;

an input/output interface through which said processor communicates with a communication network, wherein said communication network is configured to interconnect a plurality of memory nodes according to a network topology; and execution logic configured to broadcast a packet comprising a memory request to a first subset of said plurality of memory nodes, wherein each memory node of said first subset of memory nodes is removed from said processor node by no more than a given number of network hops, and wherein the execution logic comprises one or more electronic circuits; and wherein, in response to timing out rather than receiving a reply from a memory node of said first subset of memory nodes indicating that it can satisfy said memory request, said execution logic is further configured to:

increase said given number of network hops; and broadcast a packet comprising said memory request to a second subset of said plurality of memory nodes, wherein each memory node of said second subset of memory nodes is removed from said processor node by no more than said increased given number of network hops.

19. The processor node of claim 18, wherein, in response to a particular one of the plurality of memory nodes indicating that it can satisfy said memory request in response to receiving said memory request, said execution logic is further configured to send an acknowledgement to the particular memory node.

20. The processor node of claim 19, wherein, in response to each of two or more of said plurality of memory nodes indicating that it can satisfy said memory request in response to receiving said memory request, said execution logic is further configured to:

select a particular one of said two or more memory nodes;

send an acknowledgement to said particular memory node; and send a negative acknowledgement to each of said two or more memory nodes other than said particular memory node.

* * * * *